Figure 1:
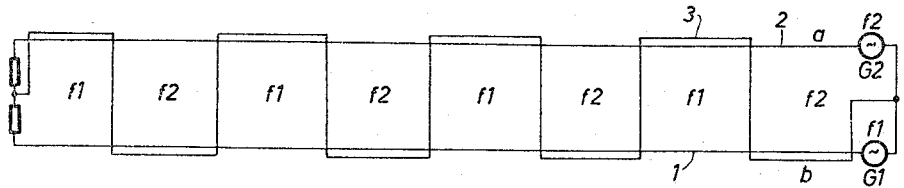

June 20, 1967    G. FRECH ET AL    3,327,111
SYSTEM FOR SUSPERVISION OF VEHICLES ALONG A ROUTE
Filed Oct. 19, 1965    2 Sheets-Sheet 1

INVENTORS
GÜNTHER FRECH
WOLFGANG KAISER
HERBERT RAHN

BY *Percy P. Lantz*
ATTORNEY

United States Patent Office 3,327,111
Patented June 20, 1967

3,327,111
SYSTEM FOR SUPERVISION OF VEHICLES ALONG A ROUTE
Gunther Frech, Stuttgart-Sonnenberg, Wolfgang Kaiser, Stuttgart-Vaihingen, and Herbert Rahn, Viernheim, Germany, assignors to International Standard Electric Corporation, New York, N.Y., a corporation of Delaware
Filed Oct. 19, 1965, Ser. No. 497,964
Claims priority, application Germany, Oct. 21, 1964, St 22,851
9 Claims. (Cl. 246—63)

This invention relates to a system for the supervision of vehicles along a route, and more particularly to a railway signalling system utilizing a plurality of conductors laid out along the route.

In one type of known supervision system line conductors are laid out alongside the route, the conductors being fed with a constant energy. The coupling properties of the conductors with the vehicle are changed at predetermined points (marking points) by crossing, transposing, shielding, screening, or changing the distances between the lines. When passing these marking points, the apparent change of the energy between the vehicle and the route is then evaluated by equipment aboard the vehicle. Other systems known in the art utilize changes in amplitude and/or phase at predetermined points along the route for the purpose of vehicle supervision.

The disadvantage of the known amplitude evaluation systems is that railway crossings and larger metal parts such as sheet metal or large tools, having a shielding effect, are capable of changing the radiation field of the line conductors. This reduces the reliability of such a system since due to the presence of these large metal objects error signals are likely to occur. The disadvantage of the phase-type supervision systems is that with meshed networks the system becomes quite complex. Also, the phase relationships at butt joints may be ambiguous on account of the different phase displacement along the conductors.

Therefore, it is the object of the instant invention to provide a system for the supervision of vehicles along a predetermined route which avoids the above-mentioned disadvantages.

Basically, the instant invention provides a plurality of conductors laid out along the route to be supervised with means for supplying a first signal having a first frequency to one of the conductors, means for supplying a second signal having a second frequency to a second one of the conductors, and means for supplying a combination of said signals of first and second frequencies to a third one of the conductors in such a manner that the current in the third conductor is substantially 180 degrees out of phase with that in the first and second conductors. The conductors are laid down along the route such that along certain given lengths of said route certain conductors are placed substantially parallel and adjacent each other to produce cancellation of signals of certain frequencies along these lengths.

Figure 2:
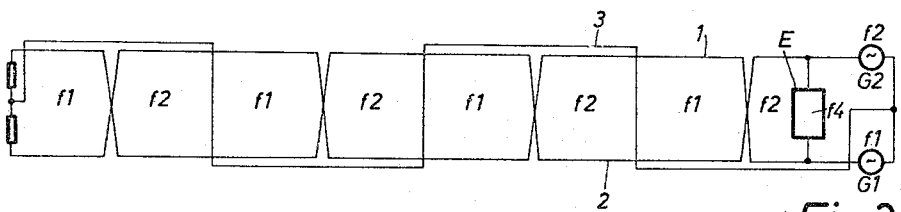
Figure 3:
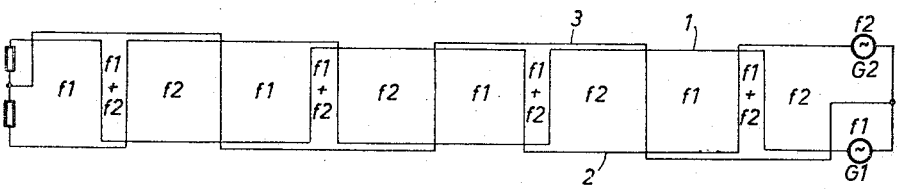
Figure 4:
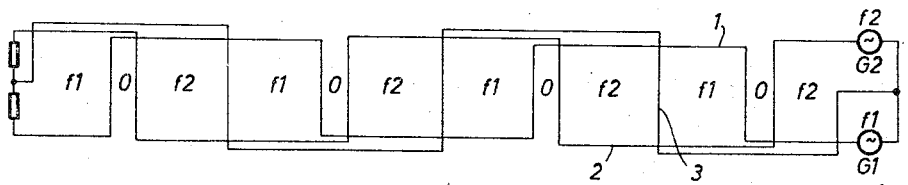
Figure 5:
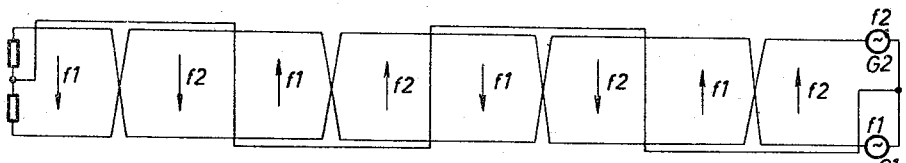
Figure 6:
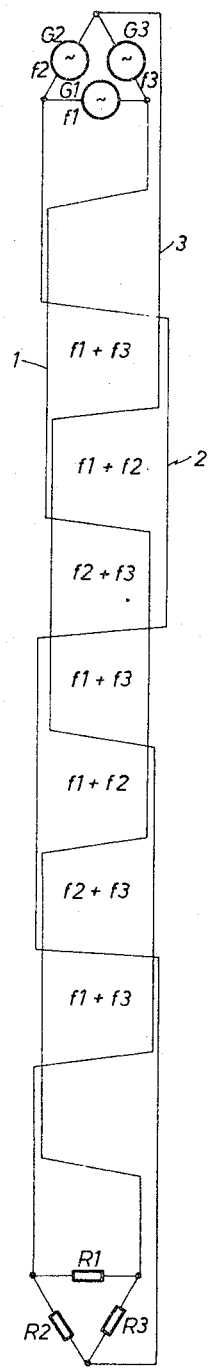

The present invention will now be explained in detail with reference to the accompanying drawings in which:

FIGURE 1 is an embodiment of the present invention employing three conductors and two active devices;
FIGURE 2 is another embodiment of this invention;
FIGURE 3 is another embodiment of this invention;
FIGURE 4 is yet another embodiment of this invention;
FIGURE 5 is still another embodiment of this invention; and
FIGURE 6 is another embodiment of this invention employing three conductors and three active devices.

In the drawings the line conductors are indicated by the symbols 1, 2, and 3 and the two sides of the route to be supervised are indicated by the reference symbols $a$ and $b$. The active devices (the signal generators) are denoted by the symbols G1, G2, and G3 and the frequencies of the active devices are denoted by $f1$, $f2$, and $f3$. In FIGURE 2 a receiver E is shown which may be used for the exchange of additional information transmitted from the vehicle.

In FIGURE 1 a system is shown having two signal generators, G1 and G2, of frequency of $f1$ and $f2$ respectively, feeding two line conductors 1 and 2. At the end of the route the conductors 1 and 2 are terminated and a common return lead 3 is laid out alternately substantially parallel and adjacent to lines 1 and 2, respectively. The common return lead 3 carries a signal having a frequency of $f1+f2$, said signal having a phase relationship with respect to the signals on lines 1 and 2 so that cancellation of certain frequencies will occur when the return line is substantially adjacent and parallel to conductor 1 or 2. For example, when the return line 3 is adjacent and parallel to conductor 1, the frequency $f1$ is canceled out and only the frequency $f2$ is radiated from this section of the route. In a similar manner only the frequency $f1$ is radiated from the section where line 3 is adjacent and parallel to conductor 2. Therefore, alternating fields of radiation with the frequencies $f1$ and $f2$ are produced along the route in accordance with the position of the return lead 3. These fields of radiation are then received and evaluated by equipment aboard the vehicle.

The operation of the circuit of FIG. 2 is similar to that of FIG. 1 except that a different line conductor configuration is shown. In effect the same radiation pattern is obtained from both circuits.

The arrangement shown in FIG. 3 produces a radiation pattern in which areas having three different frequency components ($f1$, $f2$, and $f1+f2$) are present. Again, when the return line 3 is parallel and adjacent to conductor 1, the frequency $f1$ is canceled out and when return line 3 is parallel and adjacent to conductor 2, the frequency $f2$ is canceled out. The resulting radiation pattern is indicated in FIG. 3. This configuration allows the vehicle to determine its direction of motion along the route by evaluating the succession of frequencies received.

The arrangement of FIG. 4 is similar to that of FIG. 3 and further discussion is not deemed necessary for an understanding thereof.

In FIG. 5 there is shown the phase relationships (by means of the arrows) of the radiation pattern produced by the circuit shown.

By detection of the frequencies and their phase relationships with respect to each other a vehicle may determine its direction of travel along the route.

The arrangement of FIG. 6 utilizes three conductors and three active devices (signal generators) of different frequency. This circuit arrangement produces a radiation pattern in which areas having six different frequency combinations are present. This facilitates the determination of direction and speed of the vehicle utilizing the route.

It should be noted that the apparatus aboard the vehicles utilizing the route is standard state-of-the-art equipment. For example, in a system according to FIG. 1, the equipment aboard the vehicle includes (1) an inductive pickup device or an antenna, (2) a receiver having filters tuned to the various frequencies being used and (3) a utilization device for interpreting the outputs from the receiver. This utilization device is a computer which counts the pulses of the different frequencies or counts the changes in frequencies, and/or the rate of changes of said frequencies (for speed indication). An optional piece of equipment is a transmitter and an antenna for transmitting information on a different frequency to a receiver in the central station (FIG. 2 shows a receiver E to receive such information from the vehicles).

While we have described above the principles of our invention in connection with specific apparatus, it is to be clearly understood that this description is made only by way of example and not as a limitation to the scope of our invention, as set forth in the accompanying claims.

We claim:

1. A system for the supervision of vehicles along a predetermined route comprising:
   a plurality of conductors laid out along the route to be supervised;
   means for supplying a first signal having a first frequency to a first one of said conductors;
   means for supplying a second signal having a second frequency to a second one of said conductors; and
   means for supplying a combination of said first and second signals to a third one of said conductors with the current in said third conductor substantially 180 degrees out of phase with that in said first and second conductors;
   said third conductor being substantially parallel and adjacent to certain given lengths of said first conductor and substantially parallel and adjacent to certain other given lengths of said second conductor to produce cancellation of signals of certain frequencies along said certain given lengths and cancellation of signals of certain other frequencies along said certain other given lengths.

2. A system according to claim 1 wherein said first and second conductors are laid out in a substantially parallel fashion along said route and said third conductor is alternately substantially adjacent and parallel to said first and second conductors respectively, to produce cancellation of signals of certain frequencies along said substantially adjacent and parallel lengths.

3. A system according to claim 1 wherein said third conductor is laid out along one side of the route and said first and second conductors are substantially parallel and adjacent to certain given lengths of said third conductor and substantially parallel and adjacent to certain other given lengths of the other side of said route to produce cancellation of signals of certain frequencies along said certain given lengths.

4. A system according to claim 1 wherein said first and second conductors are alternately parallel and adjacent to each side of said route for predetermined lengths and said third conductor is alternately substantially parallel and adjacent to the conductors on each side of said route, the transition of said third conductor from one side of said route to the other being at substantially the center of said predetermined lengths, thereby producing cancellation of signals of certain frequencies along certain lengths of said route.

5. A system according to claim 1 wherein said first and second conductors are alternately substantially parallel and adjacent to each side of said route for predetermined lengths and being substantially parallel and adjacent to each other along relatively short portions of said predetermined lengths, and wherein said third conductor is alternately substantially parallel and adjacent to the conductors on each side of said route, the transition of said third conductor from one side of said route to the other being substantially midway between said relatively short portions of said lengths.

6. A system according to claim 5 wherein said third conductor is substantially parallel and adjacent to said first and second conductors along said relatively short portions of said predetermined lengths.

7. A system according to claim 5 wherein said third conductor is substantially parallel and adjacent to the side of said route opposite said first and second conductors along said relatively short portions of said predetermined lengths.

8. A system for the supervision of vehicles along a predetermined route comprising:
   a plurality of conductors laid out along the route to be supervised;
   means for generating a first signal of first frequency;
   means for generating a second signal of second frequency;
   means for generating a third signal of third frequency;
   means for supplying a first combination of two of said three signals to a first one of said conductors;
   means for supplying a second different combination of two of said three signals to a second one of said conductors; and
   means for supplying a third different combination of two of said three signals to a third one of said conductors;
   said conductors being selectively substantially parallel and adjacent each other for predetermined lengths of said route to produce cancellation of signals of certain frequencies along certain ones of said predetermined lengths of said route.

9. A system according to claim 8 wherein said signal generating means comprise three signal generators of different frequency coupled together in a delta arrangement.

References Cited

FOREIGN PATENTS 1,154,502  9/1963  Germany.

ARTHUR L. LA POINT, *Primary Examiner.*

STANLEY B. GREEN, *Assistant Examiner.*